(12) United States Patent
Roudeau et al.

(10) Patent No.: US 9,381,921 B2
(45) Date of Patent: Jul. 5, 2016

(54) SYSTEM AND METHOD FOR CONTROLLING A FREE-WHEELING MOTOR VEHICLE

(71) Applicant: RENAULT s.a.s., Boulogne-Billancourt (FR)

(72) Inventors: Frederic Roudeau, Vitry sur Seine (FR); Amine Gourara, Saint Germain les Arpajon (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/782,738

(22) PCT Filed: Mar. 27, 2014

(86) PCT No.: PCT/FR2014/050726
§ 371 (c)(1),
(2) Date: Oct. 6, 2015

(87) PCT Pub. No.: WO2014/177782
PCT Pub. Date: Nov. 6, 2014

(65) Prior Publication Data
US 2016/0046291 A1 Feb. 18, 2016

(30) Foreign Application Priority Data

Apr. 30, 2013 (FR) .................................... 13 53957

(51) Int. Cl.
*B60W 30/18* (2012.01)
(52) U.S. Cl.
CPC . *B60W 30/18072* (2013.01); *B60W 2030/1809* (2013.01); *B60W 2510/1005* (2013.01); *B60W2520/10* (2013.01); *B60W 2520/105* (2013.01); *B60W 2540/12* (2013.01); *B60W 2550/142* (2013.01); *Y02T 10/48* (2013.01)

(58) Field of Classification Search
None
See application file for complete search history.

(56) References Cited

U.S. PATENT DOCUMENTS

| 5,794,170 A * | 8/1998 | Kuroda | B60T 8/172 |
| | | | 123/350 |
| 2004/0058779 A1* | 3/2004 | Ayabe | B60W 10/06 |
| | | | 477/121 |

(Continued)

FOREIGN PATENT DOCUMENTS

| DE | 10 2011 005 320 A1 | 9/2012 |
| DE | 10 2011 083 332 A1 | 3/2013 |
| WO | WO 2012/169960 A1 | 12/2012 |

OTHER PUBLICATIONS
International Search Report issued Jun. 24, 2014, in PCT/FR2014/050726 filed Mar. 27, 2014.

(Continued)

*Primary Examiner* — Justin Holmes
(74) *Attorney, Agent, or Firm* — Oblon, McClelland, Maier & Neustadt, L.L.P.

(57) ABSTRACT

A system and method for controlling a free-wheeling motor vehicle including at least one internal combustion engine connected to drive wheels by a transmission. The method includes: determining engine torque at wheels; determining longitudinal acceleration of the vehicle when a free-wheeling driving mode is activated, on the basis of resisting torques on the wheels; determining longitudinal acceleration of the vehicle when the free-wheeling driving mode is deactivated on the basis of the engine torque and the resisting torques on the wheels; determining the difference in longitudinal acceleration between when the free-wheeling driving mode is activated and the free-wheeling driving mode is deactivated; and opening the transmission chain when the longitudinal acceleration difference leans substantially toward a value of zero.

7 Claims, 1 Drawing Sheet

(56) References Cited

U.S. PATENT DOCUMENTS

| | | | |
|---|---|---|---|
| 2012/0220424 A1* | 8/2012 | Staudinger | B60W 30/16 477/80 |
| 2013/0116906 A1 | 5/2013 | Christen et al. | |
| 2014/0114553 A1 | 4/2014 | Abdul-Rasool et al. | |

OTHER PUBLICATIONS

French Search Report issued Feb. 5, 2014, in France Application 1353957 filed Apr. 30, 2013.

* cited by examiner

SYSTEM AND METHOD FOR CONTROLLING A FREE-WHEELING MOTOR VEHICLE

BACKGROUND OF THE INVENTION

The invention relates to the technical field of control of a motor vehicle having an automatic transmission.

In current applications some of the fuel consumption of a vehicle is caused by the compensation by the engine of its own resistance to movement.

It is thus necessary to reduce or to eliminate this fuel consumption when the vehicle does not require transmission to the wheel of torque originating from the internal combustion engine, the torque being engine torque or braking torque.

The following documents are known from the prior art:

Document WO2010128898 discloses "free-wheeling", without stopping the engine, based on a slope detection.

Document FR2829186 discloses the detection of the onset of free-wheeling on the basis of an acceleration pedal position threshold, an acceleration pedal position gradient, and a vehicle acceleration threshold.

Document JP59089235 discloses a mechanical system for initiating free-wheeling conditions in the absence of a need for braking and engine speed threshold.

There is thus a need for a control system and method making it possible to minimize the fuel consumption of a motor vehicle when the engine torque is not necessary for moving or stopping the vehicle.

BRIEF SUMMARY OF THE INVENTION

The invention relates to a method for controlling a motor vehicle comprising at least an internal combustion engine connected to driving wheels by a transmission. The control method comprises the following steps:

determining the engine torque at the wheels, determining the longitudinal acceleration of the vehicle when the "free-wheeling" driving mode is engaged, on the basis of the engine torque and the resisting torques at the wheel, determining the longitudinal acceleration of the vehicle when the "free-wheeling" driving mode is disengaged, on the basis of the engine torque and the resisting torques at the wheel, determining the difference in longitudinal acceleration between an engaged "free-wheeling" driving mode and a disengaged "free-wheeling" driving mode, opening the transmission chain when the longitudinal acceleration difference leans substantially toward a value of zero.

The transmission chain can be opened when all the following conditions are met:

the brake pedal is released and the longitudinal acceleration difference when switching from a disengaged "free-wheeling" driving mode into an engaged "free-wheeling" mode is less than a first positive threshold and greater than a second negative threshold, and the gear ratio engaged is greater than a threshold ratio, and the speed of the vehicle is between a minimum free-wheeling driving mode value and a maximum free-wheeling driving mode value, and the transmission chain can be closed when any one of the following conditions is met:

the brake pedal is pressed, or the longitudinal acceleration difference when switching from an engaged "free-wheeling" driving mode into a disengaged "free-wheeling" driving mode is greater than a third threshold, or the longitudinal acceleration difference when switching from an engaged "free-wheeling" driving mode into a disengaged "free-wheeling" driving mode is lower than a fourth threshold, or the gear ratio engaged is lower than a ratio threshold, or the speed of the vehicle is lower than or equal to a minimum free-wheeling driving mode value, or the speed of the vehicle is greater than or equal to a maximum free-wheeling driving mode value.

The first threshold, the second threshold, the third threshold and the fourth threshold can be calibrated on the basis of the speed of the vehicle.

It is possible to order a stopping of the internal combustion engine when ordering the opening of the transmission chain.

The invention also relates to a system for controlling a motor vehicle comprising at least an internal combustion engine connected to driving wheels by a transmission. The control system comprises a means for determining the engine torque at the wheels, a means for determining the longitudinal acceleration of the vehicle when the "free-wheeling" driving mode is engaged, on the basis of the engine torque and the resisting torques at the wheel, a means for determining the longitudinal acceleration of the vehicle when the "free-wheeling" driving mode is disengaged, on the basis of the engine torque and the resisting torques at the wheel, a means for determining the difference in longitudinal acceleration between an engaged "free-wheeling" driving mode and a disengaged "free-wheeling" driving mode, and a control means able to order the opening of the transmission chain when the longitudinal acceleration difference leans substantially toward a value of zero.

The control means may also be able to order a stopping of the internal combustion engine when ordering the opening of the transmission chain.

BRIEF DESCRIPTION OF THE DRAWINGS

Further objectives, features and advantages will become clear upon reading the following description given merely by way of non-limiting example and with reference to the accompanying drawings, in which.

DETAILED DESCRIPTION OF THE INVENTION

Figure 1:
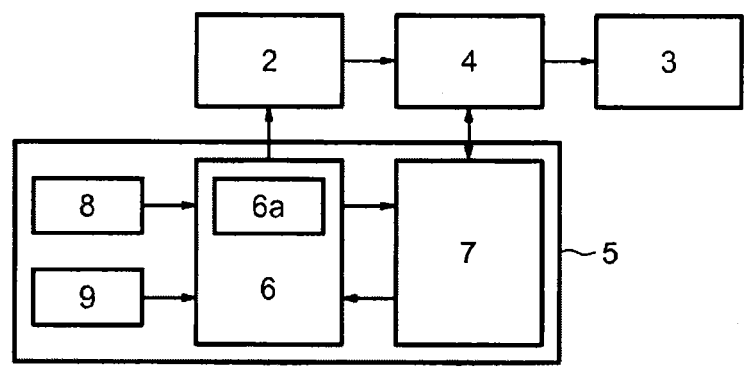
FIG. 1 illustrates the primary elements of a vehicle provided with a control system according to the invention.

FIG. 1 shows a motor vehicle comprising an engine unit 2 comprising an internal combustion engine and/or one or more electric machines, connected to the driving wheels 3 by way of a transmission 4.

The vehicle also comprises an electronic control means 5, in turn comprising an injection computer 6, a transmission computer 7, an estimator of effective engine torque 8, and an estimator of vehicle mass 9.

A coupling control system referenced 6a makes it possible to control the opening and the closing of an engine torque means to the automatic transmission during driving phases of the vehicle not requiring any motivity or any engine braking at the wheels, of thermal or electric origin. The coupling control system 6a may be disposed in the injection computer 6, as shown in FIG. 1, or may be autonomous.

The coupling control system 6a makes it possible to open the transmission chain 4 with or without stopping the engine unit 2, when the engine torque produced by the injection compensates for the losses of the engine unit 2. Such a situation corresponds to a slight pressing on the accelerator pedal in order to compensate for the drag of the engine. The control system 6a thus makes it possible to operate the vehicle in a "free-wheeling" driving mode ("sailing mode"), which maintains the movement of the vehicle without tractive force.

The coupling control system 6a comprises a means for determining the longitudinal acceleration of the vehicle when the "free-wheeling" driving mode is engaged, a means for determining the longitudinal acceleration of the vehicle when the "free-wheeling" driving mode is disengaged, a means for determining the difference in longitudinal acceleration between an engaged "free-wheeling" driving mode and a disengaged "free-wheeling" driving mode, and a control means able to control the coupling and decoupling of the engine unit to/from the transmission chain. Thus, the coupling control system receives, at the input, the estimation of the mass of the vehicle, of the torque at the wheel, and has access to the different signals available at the data buses of the vehicle. The control system emits, at the output, a control signal intended for the transmission chain 4.

The means for determining the longitudinal acceleration of the vehicle when the "free-wheeling" driving mode is engaged is able to determine the longitudinal acceleration on the basis of the resisting torques at the wheel.

The means for determining the longitudinal acceleration of the vehicle when the "free-wheeling" driving mode is disengaged is able to determine the longitudinal acceleration on the basis of the engine torque and the resisting torques at the wheel.

The equations described below specify the different calculations performed by the determination means. The control means carries out the different steps of the method, described hereinafter, in a hardware-based or software-based manner.

By applying the fundamental principle of dynamics in the longitudinal direction of the vehicle, the following equation is obtained:

$$\Sigma F_{Lon} = M_{Vh} \gamma \quad \text{(Eq. 1)}$$

When the "free-wheeling" driving mode is not engaged, i.e. when the transmission is coupled, equation 1 may be reformulated as follows:

$$M_{Vh} \gamma = F_{driv\_wheels} - F_{resist}(SCx, M_{Vh}, V_{Vh}) + M_{Vh} g \cdot \sin(\alpha_{slope}) \quad \text{(Eq. 2)}$$

With $M_{vh}$: vehicle mass
g: acceleration due to gravity
$\gamma$: longitudinal acceleration
$F_{mot\_wheels}$: driving force at the wheels
$F_{resist}$: resisting force resulting from aerodynamic, gear, and vehicle tire contributions.
$SC_x$: coefficient of aerodynamic drag
$V_{vh}$: vehicle speed
$\alpha_{slope}$: degree of inclination of the ground When the "free-wheeling" driving mode is engaged, i.e. when the transmission is decoupled, equation 1 may be reformulated as follows:

$$M_{Vh} \gamma = -F_{resist}(SCx, M_{Vh}, V_{Vh}) + M_{Vh} g \cdot \sin(\alpha_{slope}) \quad \text{(Eq. 3)}$$

The vehicle is then moved by its weight and by the resultant force of the resisting forces, which tend to decelerate the vehicle or to accelerate the vehicle in cases of a steep slope.

When switching from a disengaged "free-wheeling" driving mode to an engaged "free-wheeling" driving mode it is possible to determine a difference in longitudinal acceleration $\Delta\gamma$ on the basis of equations Eq. 2 and Eq. 3, written as follows:

$$\Delta\gamma = \frac{F_{drive\_wheels}}{M_{Vh}} = \frac{C_{drive\_wheels}}{M_{Vh} R_{wheels}} = \frac{C_{drive\_engine} * K}{M_{Vh} R_{wheels}} \quad \text{(Eq. 4)}$$

With K=current transmission ratio (outside "free-wheeling" driving mode) or envisaged transmission ratio (in "free-wheeling" driving mode),
$R_{wheels}$=mean radius of the wheels of the vehicle,
$C_{drive\_wheels}$=torque from the engine unit to the wheel,
$C_{drive\_engine}$=torque from the engine group to the primary of the transmission.

Figure 2:
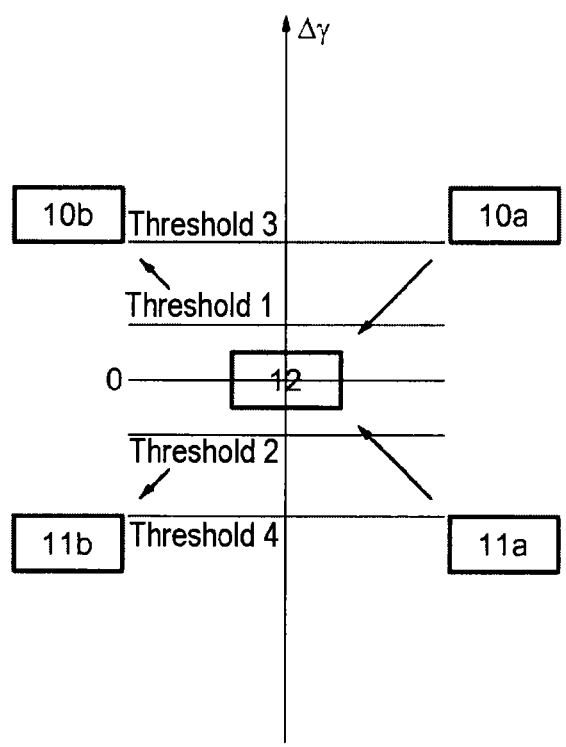
FIG. 2 illustrates the primary conditions for onset of and ending of a free-wheeling driving mode.

FIG. 2 schematically illustrates the different conditions of the onset and ending of the free-wheeling driving mode.

The onset of the free-wheeling driving mode occurs either from operation in motivity mode (referenced 10a) or from operation with fuel cut-off (referenced 11a). When the difference in longitudinal acceleration $\Delta\gamma$ is between the first threshold (threshold 1) and the second threshold (threshold 2) and the other conditions described above are met, the free-wheeling driving mode is activated (referenced 12).

In other words the control method triggers the onset of the "free-wheeling" driving mode when all the following conditions are met:
 the brake pedal is released, and
 $\Delta\gamma$<threshold 1, and
 $\Delta\gamma$>threshold 2, and
 RatioBV_current≥RatioMini_Sailing, and
 VvehMiniSailing≤Vveh_current≤VvehMaxiSailing.
 With threshold 1>0 and threshold 2<0
 RatioBV_current: current gear ratio
 RatioMini_Sailing: gear ratio in Mini mode allowing "free-wheeling"
 VvehMiniSailing: minimum speed in "free-wheeling" driving mode
 Vveh_current: current speed
 VvehMaxiSailing: maximum speed in "free-wheeling" driving mode It would also appear that the onset/ending criterion leans toward the value 0 by upper value when entering a "free-wheeling" driving mode from a mode of operation in which a tractive force of the engine unit is applied to the driving wheels.

By contrast, the onset/ending criterion leans toward the value 0 by lower value when entering into a "free-wheeling" driving mode from a fuel cut-off mode.

In addition, when the "free-wheeling" driving mode is triggered, a mode for regulating the deceleration of the internal combustion engine and/or a zero torque of the electric machines is activated. The fuel consumption is thus minimized whilst keeping the powertrain in a situation enabling traction to be resumed.

The ending of the free-wheeling mode is dependent on the conditions described below, and in particular on the development of the difference in the longitudinal acceleration $\Delta\gamma$. If the difference in the longitudinal acceleration $\Delta\gamma$ exceeds the third threshold (threshold 3), the free-wheeling driving mode is deactivated, and the vehicle resumes operation in traction mode (referenced 10b).

If the difference in longitudinal acceleration Δγ falls below the fourth threshold (threshold 4), the free-wheeling driving mode is deactivated, and the vehicle resumes operation with fuel cut-off (referenced 11b).

Thus, the control method triggers the ending of the "free-wheeling" driving mode when any one of the following conditions is met:
- the brake pedal is pressed
- Δγ>threshold 3
- Δγ<threshold 4
- RatioBV_current<RatioMini_Sailing,
- Vveh_current≥VvehMaxiSailing
- Vveh_current≤VvehMiniSailing
- With threshold 3>0 and threshold 4<0.

It will be noted that the condition Δγ>threshold 3 corresponds to a pressing of the accelerator pedal, i.e. to a request for motivity.

The condition Δγ<threshold 4 corresponds, in turn, to a complete release of the accelerator pedal, i.e. to a request for engine braking.

The values of the first threshold, of the second threshold, of the third threshold, and of the fourth threshold can be calibrated on the basis of the speed of the vehicle, in the knowledge that the acceptable values for these thresholds differ at low speed and at high speed.

Alternatively, the "free-wheeling" driving mode may be supplemented by a stopping of the heat engine during the "free-wheeling" driving mode, the activation and deactivation of the "free-wheeling" driving mode in accordance with the method described above driving the stopping and re-starting of the heat engine.

The control system and method thus make it possible to disengage and re-engage the transmission transparently for the user. In phases of disengagement of the transmission, the engine unit operates in a decelerated manner or is stopped, which makes it possible to drastically reduce the fuel consumption.

The invention claimed is:

1. A method for controlling a motor vehicle including at least an internal combustion engine connected to driving wheels by a transmission, the method comprising:
   determining engine torque at the wheels;
   determining longitudinal acceleration of the vehicle when a free-wheeling driving mode is engaged, on the basis of the engine torque and resisting torques at the wheels;
   determining longitudinal acceleration of the vehicle when the free-wheeling driving mode is disengaged, on the basis of the resisting torques at the wheels;
   determining the difference in longitudinal acceleration between an engaged free-wheeling driving mode and a disengaged free-wheeling driving mode;
   opening a transmission chain when the longitudinal acceleration difference leans substantially toward a value of zero.

2. The control method as claimed in claim 1, wherein the transmission chain is opened when all the following conditions are met:
   a brake pedal is released, and
   the longitudinal acceleration difference when switching from a disengaged free-wheeling driving mode into an engaged free-wheeling driving mode is less than a first positive threshold and greater than a second negative threshold, and
   a gear ratio engaged is greater than a ratio threshold, and
   a speed of the vehicle is between a minimum free-wheeling driving mode value and a maximum free-wheeling driving mode value.

3. The control method as claimed in claim 1, wherein the transmission chain is closed when any one of the following conditions is met:
   a brake pedal is engaged, or
   the longitudinal acceleration difference when switching from an engaged free-wheeling driving mode into a disengaged free-wheeling driving mode is greater than a third threshold, or
   the longitudinal acceleration difference when switching from an engaged free-wheeling driving mode into a disengaged free-wheeling driving mode is lower than a fourth threshold, or
   a gear ratio engaged is lower than a threshold ratio, or
   a speed of the vehicle is lower than or equal to a minimum free-wheeling driving mode value, or
   a speed of the vehicle is greater than or equal to a maximum free-wheeling driving mode value.

4. The control method as claimed in claim 3, wherein the first threshold, the second threshold, the third threshold, and the fourth threshold can be calibrated on the basis of the speed of the vehicle.

5. The control method as claimed in claim 1, wherein a stopping of the internal combustion engine is ordered when ordering the opening of the transmission chain.

6. A system for controlling a motor vehicle including at least an internal combustion engine connected to driving wheels by a transmission, the system comprising:
   a means for determining engine torque at the wheels;
   a means for determining longitudinal acceleration of the vehicle when a free-wheeling driving mode is engaged, on the basis of the engine torque and resisting torques at the wheels;
   a means for determining longitudinal acceleration of the vehicle when the free-wheeling driving mode is disengaged, on the basis of the engine torque and the resisting torques at the wheels;
   a means for determining the difference in longitudinal acceleration between an engaged free-wheeling driving mode and a disengaged free-wheeling driving mode; and
   a control means configured to order opening of a transmission chain when the longitudinal acceleration difference leans substantially toward a value of zero.

7. The control system as claimed in claim 6, wherein the control means is configured to order a stopping of the internal combustion engine when ordering the opening of the transmission chain.

* * * * *